E. Y. WHITE.
FRAME CONSTRUCTION FOR BICYCLES, MOTOR CYCLES, AND THE LIKE.
APPLICATION FILED SEPT. 10, 1913.
1,193,956. Patented Aug. 8, 1916.
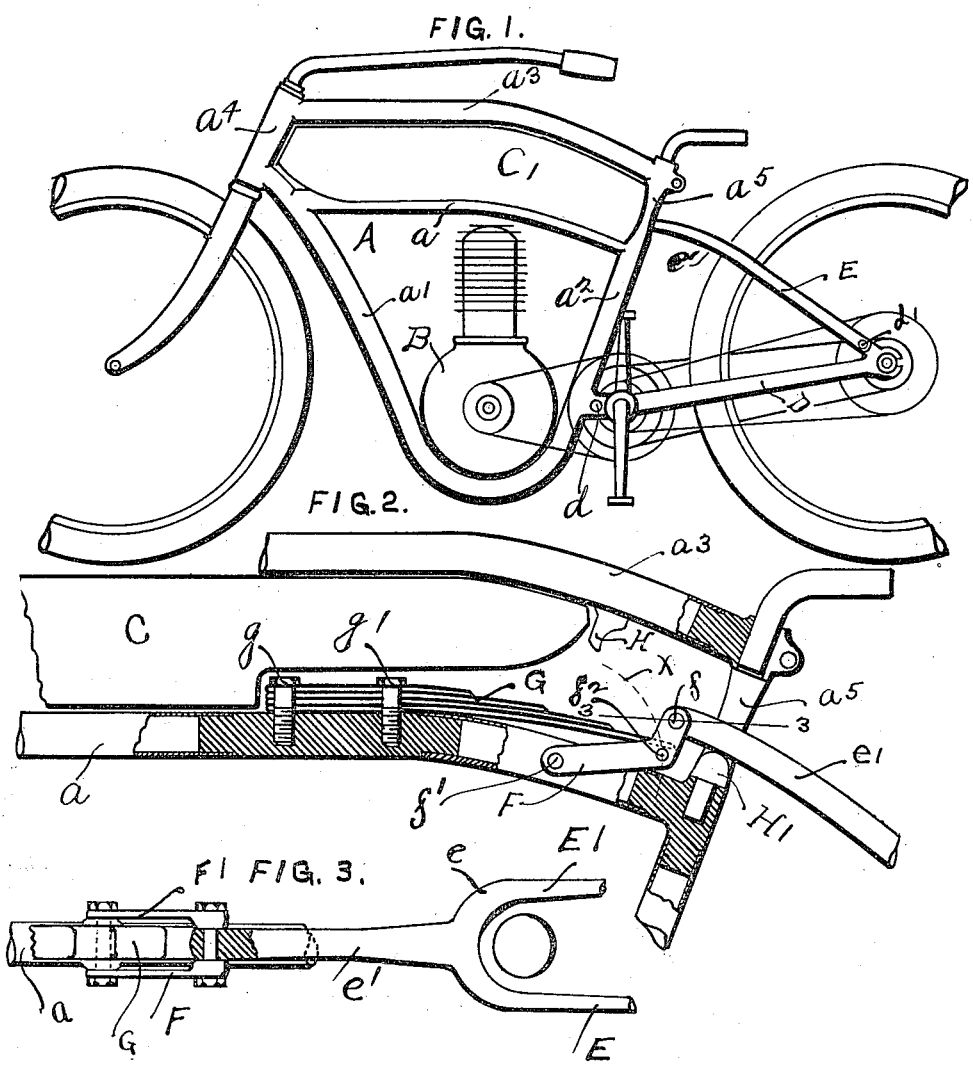

UNITED STATES PATENT OFFICE.

EDWARD YOUNG WHITE, OF SAN ANTONIO, TEXAS.

FRAME CONSTRUCTION FOR BICYCLES, MOTOR-CYCLES, AND THE LIKE.

1,193,956.

Specification of Letters Patent. Patented Aug. 8, 1916.

Application filed September 10, 1913. Serial No. 789,155.

*To all whom it may concern:*

Be it known that I, EDWARD Y. WHITE, residing at San Antonio, in the county of Bexar and State of Texas, have invented certain new and useful Improvements in Frame Construction for Bicycles, Motor-Cycles, and the like, of which the following is a specification.

My invention has to do particularly with providing a yielding or spring connection between certain portions of the motorcycle frame whereby the machine and rider may be protected from road shocks.

In the development of the motor cycle it has been found quite difficult to arrange a satisfactory spring where it will permit the necessary relative movements of the various parts of the frame without making an unsightly appearance.

My invention, therefore, consists in novel combinations and arrangement of elements which provide the necessary mechanical qualities, and at the same time produce a sightly and graceful structure.

The accompanying drawing shows one exemplifying embodiment of the invention, but it is to be understood that the invention is capable of embodiment in many different forms.

In the drawings: Figure 1 is a side elevation of a motorcycle containing one form of my invention. Fig. 2 is a similar view of a part of Fig. 1, showing certain portions cut away to reveal other parts concealed thereby, and Fig. 3 is a section looking downward upon the plane marked by the line 3—3 of Fig. 2.

Referring to the drawing, the frame A is made up of the triangular portion comprising the members $a$, $a^1$, $a^2$, and supporting the motor B, and the four-sided portion surrounding the fuel tank C, made up of the hollow forward head $a^4$, the upper tube $a^3$, the lower tube $a$, and an annular rear head $a^5$.

A rear fork D is pivoted to the frame at $d$ and carries the rear wheel in the ordinary manner, and has pivoted to its rear portion the two struts or braces E, $E^1$, united at their upper ends by a head $e$, having a shank $e^1$, extending forward through the annular head $a^5$. Two links F, $F^1$ are pivoted at one end $f$, to the shank $e^1$, and at the other end $f^1$ to the member $a$ of the frame, forming a lever connection between the shank and the frame. Between their ends they carry a roller $f^2$, and the free end of a spring G bears under downward tension upon this roller. The spring G is secured to the member $a$ at $g$, $g^1$. The dotted arc X shows the path of the roller $f^2$, and a bumper H secured to the frame member $a^3$ limits the forward movement of the shank $e^1$. Another bumper $H^1$ supported in the lower part of the annular head $a^5$ limits the recoil of the main frame.

The roller $f^2$, which acts as a bearing for one end of the spring G runs forward along the under side of said spring as the latter is put under increased tension, thereby shortening the active portion of the spring and causing a greater resistance to the downward movement of the frame. This movable bearing for one end of the flat spring affords a delicate sensitiveness to slight jolts or jars in the ordinary running and at the same time enables the spring to exert a much greater resistance to the greater jolts caused by fast running over a rough track.

The fuel tank C occupies the usual space except where room is left for the spring G, and its connections. Side plates, $C^1$, one of which is shown in Fig. 1, inclose and protect these parts.

I recognize the possibility of more or less variation in the exact form and arrangement of the parts and, therefore, do not intend to limit my invention to the specific form and arrangement of parts shown.

I claim:—

1. A motorcycle having a main frame; a rear fork pivoted to the lower portion of said frame, braces pivoted to the rear portion of said fork and extending forward and upward to the upper rear portion of the main frame, a flat spring lying along the main frame and secured at its forward end thereto, and a connecting device bearing against the other end of the spring and pivoted both to the main frame and to the upper end of the braces.

2. A motorcycle having a main frame, a rear fork pivoted to the lower portion of said frame, braces pivoted to the rear portion of said fork at one end and terminating at the other end in a shank at the upper rear portion of the frame, a lever pivoted to the shank at its rear end and to the frame at its forward end, and a flat spring having its rear free end bearing upon said lever and its forward end secured to the frame.

3. A motorcycle having a main frame containing two horizontal upper members connected by suitable upright portions at front and rear, thereby inclosing a suitable fuel tank space, a flat spring within said space secured at its forward end to the frame and having its rear free end adjacent to the rear upright portion, a rear fork pivoted at its forward end to the lower portion of the main frame, braces pivoted to the rear portion of said fork and extending therefrom to a point near the free end of said spring, and a lever pivoted to the braces and the frame and having a suitable bearing resting against the free end of the spring.

4. A motorcycle having a main frame containing two horizontal upper members connected front and rear by upright portions, the rear upright being of annular form, a flat spring secured to one of said members at its forward end and having a free end near and forward of said rear upright, a rear fork pivoted at its forward end to the lower portion of the main frame, braces pivoted at their lower ends to the rear portion of said fork and terminating at their upper ends in a shank extending through said rear upright and a lever pivoted to the shank and the main frame and having a portion bearing against the free end of said spring.

5. The combination with the frame of a motorcycle, of a rear fork pivoted to the frame, rear braces pivoted to the fork, a link connection between the braces and the frame, and a spring fast at one end to the frame, and having a sliding engagement at its other end with said link connection.

6. In cycle frame construction, the combination of a main frame having a substantially horizontal tube, a leaf spring connected to said tube at one end and located within said main frame, a driving wheel frame pivoted to the main frame, and a connection between said driving wheel frame and the free end of said spring.

7. In a motorcycle, the combination of a rigid main frame, a rear fork pivoted thereto, rear braces pivoted to the fork, a leaf spring carried within the outline limits of the main frame, and a lever engaging said spring and connected with said braces.

8. In a motorcycle, the combination of a main frame, a rear wheel frame having an articulated connection with the main frame, a leaf spring and a connector between the spring and said wheel frame, said connector having a shifting engagement with said spring.

9. In a motorcycle, the combination of a rigid main frame having two approximately parallel longitudinal bars near the top of said frame, a rear wheel frame pivoted to the main frame, a leaf spring carried by the main frame in the space between said bars, and a connection between the wheel frame and said spring.

10. In a motorcycle, the combination of a rigid main frame having two approximately parallel longitudinal bars near the top of said frame, a rear wheel frame pivoted to the main frame, a leaf spring carried by the main frame in the space between said bars, and a shifting connection between the wheel frame and said spring.

11. In a motorcycle, a main frame comprising a steering head, a rear tube and two approximately horizontal tubes connecting the head and rear tube providing a space for a tank between them, a driving wheel frame pivotally connected to the main frame and a leaf spring acting upon the driving wheel frame, said spring being carried by the main frame within the space between said approximately horizontal tubes.

12. In a motorcycle, a main frame comprising a steering head, a rear tube and two approximately horizontal tubes connecting the head and rear tube providing a space for a tank between them, a driving wheel frame pivotally connected to the main frame and a leaf spring for flexibly supporting the main frame upon the driving wheel frame, said spring being carried by the main frame within the space between said approximately horizontal tubes, and cover plates substantially covering the space between said tubes to conceal and protect said spring.

13. In a motorcycle frame construction, the combination of a main frame comprising two approximately horizontal tubes, a tank located therebetween and shaped to provide a spring space between said tubes near the rear, a spring located in said space and connected to one of the tubes, a wheel frame pivotally connected to the main frame and a connection between said wheel frame and said spring.

14. In a motorcycle, the combination of a main frame having two approximately horizontal tubes, a rear tube connecting them and having an annular head, a spring located in the main frame between said horizontal tubes, a rear wheel frame pivotally connected to the main frame and a fork comprised in the rear wheel frame and having a part extending through the annular head and connected to said spring.

15. In a motorcycle, the combination of a main frame having two approximately horizontal tubes, a rear tube connecting them and having an annular head, a spring located in the main frame between said horizontal tubes, a rear wheel frame pivotally connected to the main frame and a fork comprised in the rear wheel frame and having a part extending through the annular head and connected to said spring, and a stop to limit the relative movement of the main and wheel frames in one direction.

16. In a motorcycle, the combination of a main frame having two approximately horizontal tubes, a rear tube connecting them and having an annular head, a spring located in the main frame between said horizontal tubes, a rear wheel frame pivotally connected to the main frame and a fork comprised in the rear wheel frame and having a part extending through the annular head and connected to said spring, and stops to limit the relative movement of the main and wheel frames in both directions.

EDWARD YOUNG WHITE.

Witnesses:
 JAKE DOLD,
 G. W. BRENNER.

Copies of this patent may be obtained for five cents each, by addressing the "Commissioner of Patents, Washington, D. C."